US012801135B2

(12) United States Patent
Lu et al.

(10) Patent No.: US 12,801,135 B2
(45) Date of Patent: *Nov. 17, 2026

(54) AUGMENTED LEARNING MODEL FOR AUTONOMOUS EARTH-MOVING VEHICLES

(71) Applicant: AIM INTELLIGENT MACHINES, INC., Redmond, WA (US)

(72) Inventors: Devin Lu, Sunnyvale, CA (US); Thomas Wei, Plano, TX (US)

(73) Assignee: AIM Intelligent Machines, Inc., Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/305,279

(22) Filed: Aug. 20, 2025

(65) Prior Publication Data

US 2026/0030554 A1 Jan. 29, 2026

Related U.S. Application Data

(63) Continuation of application No. 18/463,185, filed on Sep. 7, 2023, now Pat. No. 12,436,531.
(Continued)

(51) Int. Cl.
*G05D 1/249* (2024.01)
*G05D 1/00* (2006.01)
(Continued)

(52) U.S. Cl.
CPC ........... *G05D 1/0088* (2013.01); *G05D 1/249* (2024.01); *G06N 3/08* (2013.01); *G06N 20/00* (2019.01);
(Continued)

(58) Field of Classification Search
CPC .. G05D 1/0088; G05D 1/249; G05D 2101/15; G06N 3/08; G06N 20/00; B66C 13/48; E02F 9/205
See application file for complete search history.

(56) References Cited

U.S. PATENT DOCUMENTS

| | | | |
|---|---|---|---|
| 4,741,163 | A | 5/1988 | Hidaka et al. |
| 10,066,367 | B1 | 9/2018 | Wang et al. |

(Continued)

FOREIGN PATENT DOCUMENTS

| | | |
|---|---|---|
| JP | 2016105557 A | 6/2016 |
| JP | 2024544196 A | 11/2024 |

(Continued)

OTHER PUBLICATIONS

PCT/US2024/027430 International Preliminary Report on Patentability dated Nov. 13, 2025.
(Continued)

*Primary Examiner* — Calvin Cheung
(74) *Attorney, Agent, or Firm* — Wilson Sonsini Goodrich & Rosati

(57) ABSTRACT

Systems and methods for using augmented learning models for autonomous earth-moving vehicles are disclosed. The method can comprise receiving a second set of sensor data; generating a first condensed vector from the second set of sensor data at least in part by processing the second set of sensor data with a first machine learning model; selecting an action to be performed by the vehicle at least in part by processing the first condensed vector with a second machine learning model. The method can further comprise retrieving one or more samples of sensor data from the first set of sensor data; fine-tuning the first machine learning model at least in part by processing the one or more samples of sensor data to produce a second condensed vector; and fine-tuning the second machine learning model at least in part by processing the second condensed vector.

20 Claims, 5 Drawing Sheets

Related U.S. Application Data

(60) Provisional application No. 63/500,227, filed on May 4, 2023.

(51) Int. Cl.

| | |
|---|---|
| ***G06N 3/08*** | (2023.01) |
| ***G06N 20/00*** | (2019.01) |
| *B66C 13/48* | (2006.01) |
| *E02F 9/20* | (2006.01) |
| *G05D 101/15* | (2024.01) |

(52) U.S. Cl.

CPC ............... *B66C 13/48* (2013.01); *E02F 9/205* (2013.01); *G05D 2101/15* (2024.01)

(56) References Cited

U.S. PATENT DOCUMENTS

| | | | | |
|---|---|---|---|---|
| 11,989,268 | B2 * | 5/2024 | Prabhu | H04W 12/065 |
| 12,436,531 | B2 | 10/2025 | Lu et al. | |
| 2002/0162668 | A1 | 11/2002 | Carlson et al. | |
| 2005/0021745 | A1 | 1/2005 | Bookman et al. | |
| 2012/0226548 | A1 | 9/2012 | Hanna | |
| 2013/0224721 | A1 | 8/2013 | Gilling | |
| 2019/0049970 | A1 | 2/2019 | Djuric et al. | |
| 2019/0197396 | A1 | 6/2019 | Rajkumar et al. | |
| 2020/0279402 | A1 | 9/2020 | Cheng et al. | |
| 2021/0073584 | A1 * | 3/2021 | St. Romain, II | G06N 3/0475 |
| 2022/0011776 | A1 | 1/2022 | Narang et al. | |
| 2022/0412057 | A1 | 12/2022 | Kikani et al. | |
| 2023/0021034 | A1 | 1/2023 | Cui et al. | |
| 2023/0053785 | A1 | 2/2023 | Carvalho et al. | |
| 2023/0161354 | A1 * | 5/2023 | Chen | G06N 3/08 703/8 |
| 2023/0177819 | A1 | 6/2023 | Iandola et al. | |
| 2023/0382407 | A1 * | 11/2023 | Donderici | B60W 50/06 |
| 2024/0048652 | A1 | 2/2024 | Gottam et al. | |
| 2024/0124004 | A1 | 4/2024 | Donderici | |

FOREIGN PATENT DOCUMENTS

| | | | |
|---|---|---|---|
| WO | WO-2024229234 | A2 | 11/2024 |
| WO | WO-2024238919 | A1 | 11/2024 |

OTHER PUBLICATIONS

PCT/US2024/027430 International Search Report and Written Opinion dated Aug. 21, 2024.

U.S. Appl. No. 18/463,185 Corrected Notice of Allowability dated Sep. 5, 2025.

U.S. Appl. No. 18/463,185 Notice of Allowance dated May 28, 2025.

U.S. Appl. No. 18/463,185 Office Action dated Apr. 14, 2025.

* cited by examiner

AUGMENTED LEARNING MODEL FOR AUTONOMOUS EARTH-MOVING VEHICLES

CROSS REFERENCE

This application is a continuation of U.S. application Ser. No. 18/463,185, filed Sep. 7, 2023, which claims the benefit of priority to U.S. Provisional Application No. 63/500,227, filed May 4, 2023, each of which are incorporated herein by reference in their entirety.

BACKGROUND

Earth-moving vehicles (EMVs) are heavy equipment machines designed to move large quantities of earth, rocks, soil, or debris during construction, mining, agriculture, or any other earth-moving activity. These vehicles are designed to perform a variety of tasks, such as excavation, grading, leveling, hauling, and demolition. For example, an excavator can be used for digging dirt and other materials from the ground. A backhoe loader is similar to the excavator but is smaller and includes an adjustable shovel in the front and a bucket in the back for more precise digging. A bulldozer can be used to move and grade dirt across large tracts of land. These EMVs are typically controlled by human operators and can be dangerous and cause injuries due to accidents. Furthermore, using human operators can be expensive and limited in the time the EMVs can operate.

SUMMARY

The present disclosure provides systems and methods directed to augmented learning models for autonomous EMVs that can improve the operation of EMVs. The systems and methods described herein can help reduce, or even eliminate, injuries caused at construction sites when using EMVs. The systems and methods described herein can also help automate the process of using EMVs at construction sites. The systems and methods described herein can further help decrease the amount of time it takes to train and re-train the machine learning model of artificial intelligence-operated EMVs.

An aspect includes a method for autonomous operation of a vehicle, comprising: (a) maintaining, at a computer data store, a first set of sensor data; and (b) until a convergence condition is reached: (i) executing, by one or more processors, a first set of instructions and a second set of instructions in parallel, the first set of instructions comprising: (1) receiving a second set of sensor data, wherein the second set of sensor data is not included within the first set of sensor data; (2) generating a first condensed vector from the second set of sensor data at least in part by processing the second set of sensor data with a first machine learning model; (3) selecting an action to be performed by the vehicle at least in part by processing the first condensed vector with a second machine learning model; (ii) the second set of instructions comprising: (1) retrieving one or more samples of sensor data from the first set of sensor data; (2) fine-tuning the first machine learning model at least in part by processing the one or more samples of sensor data to produce a second condensed vector; and (3) fine-tuning the second machine learning model at least in part by processing the second condensed vector.

In some embodiments, the first machine learning model includes a first set of model weights, and the second machine learning model includes a second set of model weights.

In some embodiments, the fine-tuning further comprises changing the first set of model weights and/or the second set of model weights based on an outcome of the action.

In some embodiments, the vehicle comprises an earth-moving vehicle or piece of heavy machinery.

In some embodiments, the earth-moving vehicle or piece of heavy machinery comprises an earthmover, bulldozer, backhoe, shovel, tractor, snowcat, excavator, crane, forklift, boring machine, harvester, compactor, drilling machine, pile driver, street sweeper, snow plow machine, cherry picker, or dump truck.

In some embodiments, the first set of instructions is executed on a first thread and the second set of instructions is executing on a second thread.

In some embodiments, the method further comprises, prior to (b), (i) training, by the one or more processors, the first machine learning model on the first set of sensor data and (ii) training, by the one or more processors, the second machine learning model at least in part on the first condensed vector produced by the first machine learning model.

In some embodiments, the method further comprises training, by the one or more processors, the second machine learning model on the first set of sensor data.

In some embodiments, the method further comprises, prior to (b), condensing, by sampling, the first set of sensor data.

In some embodiments, the method further comprises, prior to (2), condensing, by sampling, the second set of sensor data.

In some embodiments, the fine-tuning further comprising, computing the differences between the first set of sensor data and the second set of sensor data.

In some embodiments, the first set of sensor data comprises light detection and ranging (LIDAR) data, GPS data, vehicle state data, or a combination thereof, and wherein the second set of sensor data comprises LIDAR data, GPS data, vehicle state data, or a combination thereof.

In some embodiments, the vehicle state data comprises position data or motion data.

In some embodiments, the position data is associated with a component of the vehicle.

In some embodiments, the position data is associated with an angle or orientation of the component of the vehicle.

In some embodiments, the component of the vehicle comprises an arm, a blade, or a tool. In some embodiments, the tool comprises a digging bucket, a hammer, a hydraulic thumb, coupler, breaker, compactor, grading bucket, demolition grapple, and tiltrotator.

In some embodiments, the motion data relates to speed or acceleration. In some embodiments, the motion data is the speed of the vehicle. In some embodiments, the motion data is the acceleration of the vehicle. In some embodiments, the motion data is associated with a component of the vehicle. In some embodiments, the motion data relates to speed or acceleration.

In some embodiments, in (b)(ii)(1), the one or more samples of sensor data are sampled from the memory buffer.

In some embodiments, the first condensed vector or the second condensed vector is a learned representation, an encoding, or an embedding.

In some embodiments, the action is selected from a finite set of actions.

In some embodiments, the finite set of actions comprises a movement of the vehicle, an actuation of a portion of the vehicle, powering up the vehicle, powering down the vehicle, and/or reversing a previous operation of the vehicle.

In some embodiments, a movement of the vehicle comprises a forward, backward, or sideways movement of the vehicle.

In some embodiments, a movement of the portion of the vehicle comprises an upward, downward, forward, or sideways movement of an arm of the vehicle.

In some embodiments, a movement of the portion of the vehicle comprises an outward or inward movement of a tool connected to the arm of the vehicle.

In some embodiments, the convergence condition is associated with a number of actions performed by the vehicle.

In some embodiments, a completion of the number of actions comprises a task.

Another aspect is a system for autonomously operating a vehicle, comprising: one or more sensors configured to output a first set of sensor data and a second set of sensor data, the second set of sensor data not included in the first set of sensor data; a computer data store configured to store the first set of sensor data; and one or more processors configured to, until a convergence condition is reached: (a) execute a first set of instructions and a second set of instructions in parallel, the first set of instructions comprising: (1) receiving the second set of sensor data; (2) generating a first condensed vector from the second set of sensor data at least in part by processing the second set of sensor data with a first machine learning model; (3) selecting an action to be performed by the vehicle at least in part by processing the first condensed vector with a second machine learning model; (b) the second set of instructions comprising: (1) retrieving one or more samples of sensor data from the first set of sensor data; (2) fine-tuning the first machine learning model at least in part by processing the one or more samples of sensor data to produce a second condensed vector; and (3) fine-tuning the second machine learning model at least in part by processing the second condensed vector.

In some embodiments, the first machine learning model includes a first set of model weights, and the second machine learning model includes a second set of model weights.

In some embodiments, the second sets of instructions further include changing the first set of model weights and/or the second set of model weights based on an outcome of the action.

In some embodiments, the vehicle comprises an earth-moving vehicle or piece of heavy machinery.

In some embodiments, the earth-moving vehicle or piece of heavy machinery comprises an earthmover, bulldozer, backhoe, shovel, tractor, snowcat, excavator, crane, forklift, boring machine, harvester, compactor, drilling machine, pile driver, street sweeper, snow plow machine, cherry picker, or dump truck.

In some embodiments, the first set of instructions is executed on a first thread and the second set of instructions is executing on a second thread.

In some embodiments, the one or more processors are configured to execute a third set of instructions prior to the first and second sets of instructions, the third set of instructions including (i) training the first machine learning model on the first set of sensor data and (ii) training the second machine learning model at least in part on the first condensed vector produced by the first machine learning model.

In some embodiments, the third set of instructions further include training the second machine learning model on the first set of sensor data.

In some embodiments, the third set of instructions further include condensing the first set of sensor data by sampling the first set of sensor data.

In some embodiments, the first set of instructions further include, prior to (a)(2), condensing the second set of sensor data by sampling the second set of sensor data.

In some embodiments, the second set of instructions further include computing differences between the first set of sensor data and the second set of sensor data.

In some embodiments, the first set of sensor data comprises light detection and ranging (LIDAR) data, GPS data, vehicle state data, or a combination thereof, and wherein the second set of sensor data comprises LIDAR data, GPS data, vehicle state data, or a combination thereof.

In some embodiments, the vehicle state data comprises position data or motion data. In some embodiments, the position data is associated with a component of the vehicle. In some embodiments, the position data is associated with an angle or orientation of the component of the vehicle.

In some embodiments, the component of the vehicle comprises an arm, a blade, or a tool. In some embodiments, the tool comprises a digging bucket, a hammer, a hydraulic thumb, coupler, breaker, compactor, grading bucket, demolition grapple, and tiltrotator.

In some embodiments, the motion data relates to speed or acceleration. In some embodiments, the motion data is the speed of the vehicle. In some embodiments, the motion data is the acceleration of the vehicle. In some embodiments, the motion data is associated with a component of the vehicle. In some embodiments, the motion data relates to speed or acceleration.

In some embodiments, the one or more samples of sensor data are sampled from the computer data store.

In some embodiments, the first condensed vector or the second condensed vector is a learned representation, an encoding, or an embedding.

In some embodiments, the action is selected from a finite set of actions.

In some embodiments, the finite set of actions comprises a movement of the vehicle, an actuation of a portion of the vehicle, powering up the vehicle, powering down the vehicle, and/or reversing a previous operation of the vehicle. In some embodiments, the movement of the vehicle comprises a forward, backward, or sideways movement of the vehicle.

In some embodiments, a movement of the portion of the vehicle comprises an upward, downward, forward, or sideways movement of an arm of the vehicle.

In some embodiments, a movement of the portion of the vehicle comprises an outward or inward movement of a tool connected to the arm of the vehicle.

In some embodiments, the convergence condition is associated with a number of actions performed by the vehicle.

In some embodiments, a completion of the number of actions comprises a task.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Overview

Figure 1:
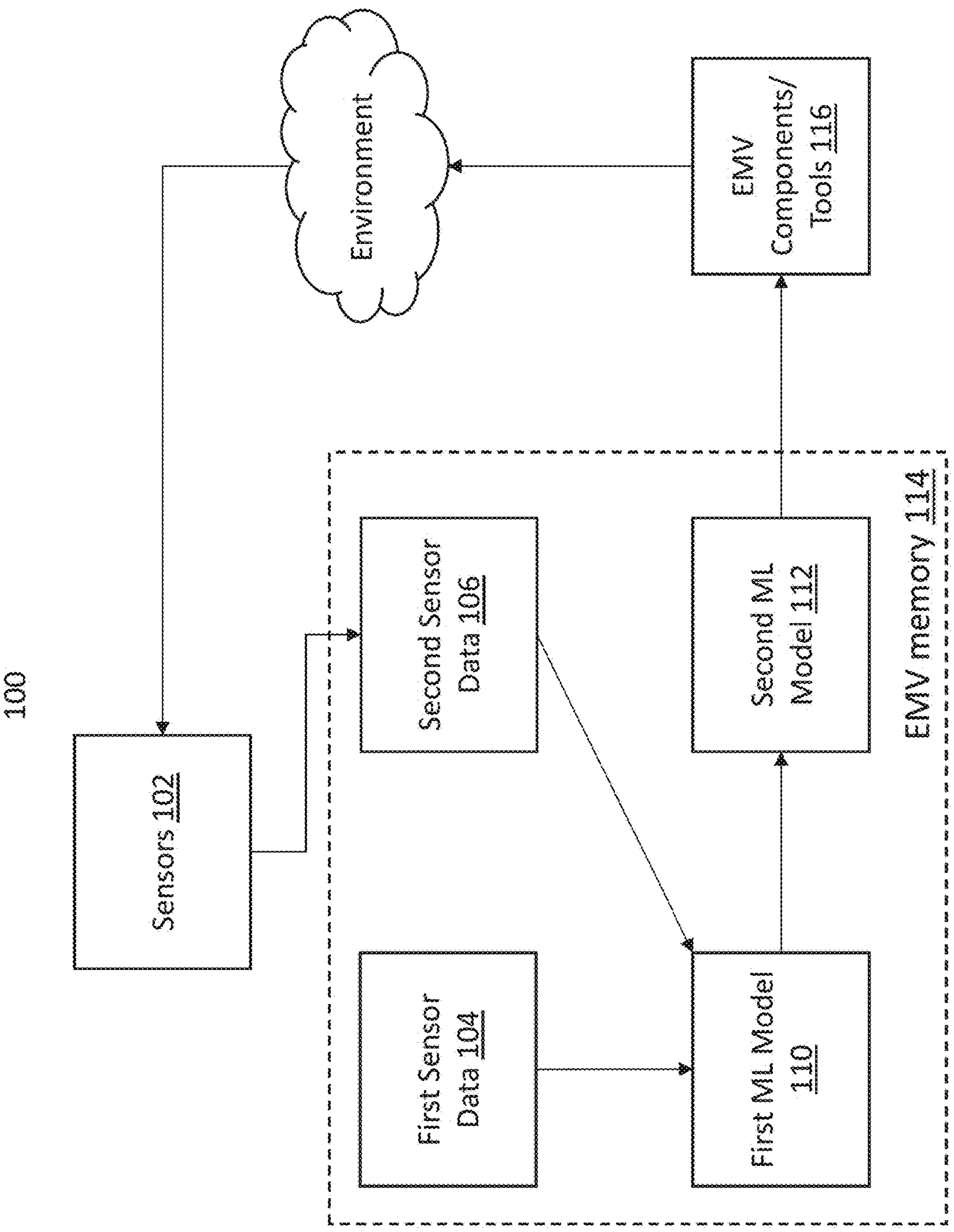
FIG. 1 shows non-limiting example of a system that includes some of the components of the EMV and data flow.

The present disclosure includes systems and methods that provide advantages over conventional EMVs and also EMVs static control algorithms. A machine or device that is run on a machine learning model is typically not equipped to have its model retrained or updated based on new information because retraining the model can take much time and processing power. The actions performed by the machine do not grow in efficiency or performance because the control algorithm based on a static or frozen model which can lead to inefficiencies and degraded performance.

The systems and methods disclosed herein can use augmented learning to improve and/or fine-tune machine learning models which can increase efficiency and/or efficacy of machines. The machines can be deployed with two machine learning models, with one model that is a model of the external environment and another model that is a behavior model for predicting or producing the next action. Both models that are saved on the EMV can be fine-tuned based on external environments. The augmented learning of the models can lead to greater efficiency and performance which can lead to reduced project times and cost savings.

Machine Learning Methodologies

The systems, the methods, the computer-readable media, and the techniques described herein may use machine learning. In some cases, machine learning may generally involve identifying and recognizing patterns in existing data in order to facilitate making predictions for subsequent data. Machine learning may include a machine learning model (which may include, for example, a machine learning algorithm). Machine learning, whether analytical or statistical in nature, may provide deductive or abductive inference based on real or simulated data.

The machine learning model may be a trained model. Machine learning (ML) may comprise one or more supervised, semi-supervised, self-supervised, or unsupervised machine learning techniques. For example, an ML model may be a trained model that is trained through supervised learning (e.g., various parameters are determined as weights or scaling factors).

Training the machine learning model may include, in some cases, selecting one or more initialized data models to train using a training data set. The selected initialized data models may include any type of untrained machine learning models for supervised, semi-supervised, self-supervised, or unsupervised machine learning. The selected initialized data models may be specified based upon input (e.g., user input) specifying relevant parameters to use as predicted variables or other variables to use as potential explanatory variables. For example, the predicted or other variables can be the variable that the models are trained to predict, and the explanatory variables can be the variables used to predict or explain differences in the predicted/other variables. For example, the selected initialized data models may be specified to generate an output (e.g., a prediction) based upon the input. Conditions for training the machine learning model from the selected initialized data models may likewise be selected, such as limits on the machine learning model complexity or limits on the machine learning model refinement past a certain point. The machine learning model may be trained (e.g., via a computer system such as a server) using the training data set. In some cases, a first subset of the training data set may be selected to train the machine learning model. The selected initialized data models may then be trained on the first subset of training data set using appropriate machine learning techniques, based upon the type of machine learning model selected and any conditions specified for training the machine learning model. In some cases, due to the processing power requirements of training the machine learning model, the selected initialized data models may be trained using additional computing resources (e.g., cloud computing resources). Such training may continue indefinitely, in some cases, until at least one aspect of the machine learning model is validated and meets selection criteria to be used as a predictive model.

In some cases, one or more aspects of the machine learning model may be validated using a second subset of the training data set (e.g., distinct from the first subset of the training data set) to determine accuracy and robustness of the machine learning model. Such validation may include applying the machine learning model to the second subset of the training data set to make predictions derived from the second subset of the training data. The machine learning model may then be evaluated to determine whether performance is sufficient based upon the derived predictions. The sufficiency criteria applied to the machine learning model may vary depending upon the size of the training data set available for training, the performance of previous iterations of trained models, or user-specified performance requirements. If the machine learning model does not achieve sufficient performance, additional training may be performed. Additional model improvements may include refinement of the machine learning model or retraining on a different first subset of the training dataset, after which the new machine learning model may again be validated and assessed. When the machine learning model has achieved sufficient performance, in some cases, the machine learning model may be stored for present or future use. The machine learning model may be stored as sets of parameter values or weights for analysis of further input (e.g., further relevant parameters to use as further predicted variables, further explanatory variables, further user interaction data, etc.), which may also include analysis logic or indications of model validity in some instances. In some cases, a plurality of machine learning models may be stored for generating predictions under different sets of input data conditions. In some embodiments, the machine learning model may be stored in a database (e.g., associated with server).

ML may comprise one or more of regression analysis, regularization, classification, dimensionality reduction, ensemble learning, meta learning, association rule learning, cluster analysis, anomaly detection, deep learning, or ultra-deep learning. ML may comprise, but is not limited to: k-means, k-means clustering, k-nearest neighbors, learning vector quantization, linear regression, non-linear regression, least squares regression, partial least squares regression, logistic regression, stepwise regression, multivariate adaptive regression splines, ridge regression, principal component regression, least absolute shrinkage and selection operation, least angle regression, canonical correlation analysis, factor analysis, independent component analysis, linear discriminant analysis, multidimensional scaling, non-negative matrix factorization, principal components analysis, principal coordinates analysis, projection pursuit, Sammon mapping, t-distributed stochastic neighbor embedding, AdaBoosting, boosting, gradient boosting, bootstrap aggregation, ensemble averaging, decision trees, conditional decision trees, boosted decision trees, gradient boosted decision trees, random forests, stacked generalization, Bayesian networks, Bayesian belief networks, naïve Bayes, Gaussian naïve Bayes, multinomial naïve Bayes, hidden Markov models, hierarchical hidden Markov models, support vector machines, encoders, decoders, auto-encoders, stacked auto-encoders, perceptrons, multi-layer perceptrons, artificial neural networks, feedforward neural networks, convolutional neural networks, recurrent neural networks, long short-term memory, deep belief networks, deep Boltzmann machines, deep convolutional neural networks, deep recurrent neural networks, or generative adversarial networks.

Reinforcement learning is a type of machine learning where an agent learns to make decisions in an environment in order to maximize a cumulative reward signal. In reinforcement learning, the agent interacts with an environment and takes actions based on its current state. The environment then responds with a reward signal that reflects the quality of the action taken by the agent. The goal of the agent is to learn a policy or strategy that maximizes the cumulative reward over time. The reinforcement learning framework involves three key components: the agent, the environment, and the reward signal. The agent takes actions in the environment, and the environment provides feedback in the form of rewards or penalties. The agent uses this feedback to adjust its behavior and improve its performance over time. Reinforcement learning algorithms typically involve trial-and-error learning and can be computationally intensive.

Fine-tuning includes the process of taking a pre-trained machine learning model and further training it on a new task or dataset. In this process, the weights of the pre-trained model are updated based on the new data or task. Fine-tuning can be helpful where a model trained on a large dataset is used as a starting point to solve a similar task with a smaller dataset. The pre-trained model has already learned useful features that can be applied to the new task, which can save time and resources compared to training a new model from scratch. The fine-tuning process involves freezing some of the layers of the pre-trained model and re-training only the final layers or adding new layers to adapt the model to the new task. The amount of fine-tuning required depends on the similarity of the new task to the original pre-training task, the size and quality of the new dataset, and the complexity of the pre-trained model.

System

FIG. 1 shows non-limiting example of a system 100 that includes some of the components of the EMV and data flow. The system 100 includes one or more sensors 102, an EMV memory 114 on board the EMV, and one or more components/tools 116 of the EMV. Although certain elements of the system 100 are shown in FIG. 1, embodiments are not limited thereto, and additional elements can be added (e.g., one or more processors) or elements can be removed, as will be recognized by one of ordinary skill in the art. Furthermore, the arrows which indicate data flow are drawn for simplicity and clarity, and one of ordinary skill will recognize that the sensors provide data first to the processor before the processor stores the data in the memory. Similarly, in order to train the machine learning models, one of ordinary skill in the art will recognize that the sensor data needs to be read from the memory and processed (or processed before the sensor data is stored in the memory) before training or fine-tuning the machine learning models with the sensor data.

In some embodiments, the vehicle comprises an EMV or piece of heavy machinery. In some embodiments, the earth-moving vehicle or piece of heavy machinery comprises an earthmover, bulldozer, backhoe, shovel, tractor, snowcat, excavator, crane, forklift, boring machine, harvester, compactor, drilling machine, pile driver, street sweeper, snow plow machine, cherry picker, or dump truck.

The sensors 102 can include one or more types of sensors and one or more of the same type of sensors. The type of sensors can include light detection ranging and ranging (LIDAR) sensors, global position system (GPS) sensors, cameras, radar sensors, inertial measurement unit (IMU) sensors, vehicle sensors, tire pressure sensors, temperature sensors, battery level sensors, fuel level sensors, wind speed sensors, infrared sensors, and others. Each of the sensors 102 described herein can provide and sensor data to the memory 114. The sensors may be positioned around the EMV and/or in an environment where the EMV is operating (e.g., construction site). The sensors can each communicate via wired or wireless connection to the EMV.

Sensors 102 can generate and output sensor data including first sensor data (or first set of sensor data) 104 and second sensor data (or second set of sensor data) 106. The memory 114 can store the output of the sensors 102. The first set of sensor data can include offline data which can include, for example, data of the EMV such as type of vehicle, past actions, operating time, and other operational data. The offline data can also include data about the EMV's environment such as weather, time, materials, and others. The offline data can include data that were previously sensed by the sensors and stored. Both the first set of sensor data and the second set of sensor data can include vehicle state data.

The first set of sensor data can include the offline data used to train and fine-tune the models. The second sensor data can include additional data that is received and/or detected and/or sensed after the MLs have been initially trained. The second set of sensor data or a subset thereof can be used to fine-tune the models as described herein.

In some embodiments, the vehicle state data comprises position data or motion data. In some embodiments, the position data is associated with a component of the vehicle. For example, the position data can include a history of the component's positions at various timepoints. The position data can be stored at intervals (e.g., every 1 second) or be stored whenever there is movement of the component.

In some embodiments, the position data is associated with an angle or orientation of the component of the vehicle. For example, the angle may be measured against an x-, y- or z-axis of the EMV. In some embodiments, the angle may be measured against an x-axis of the ground. The position data can include a history of the angle and/or orientation of the component as well, as discussed above.

In some embodiments, the motion data relates to speed or acceleration. In some embodiments, the motion data includes the speed of the EMV (e.g., how fast the EMV is moving along a terrain) or the speed of the component of the EMV (e.g., how fast the arm is moving). In some embodiments, the motion data includes the acceleration and/or deceleration of the EMV or the component of the EMV. In some embodiments, the motion data is associated with a component of the vehicle. The motion data can also include how fast individual components of the EMV is moving (e.g., the arm, blade, and/or tool).

The memory 114 can also store the first machine learning model 110 and a second machine learning model 112. The first machine learning model 110 can include a world model, and the second machine learning model 112 can include a behavior model. The first and second machine learning models 110 and 112 are described in greater detail below.

The EMV components/tools 116 can include one or more different components and/or tools that are attached to the EMV. In some embodiments, the component of the vehicle comprises an arm, a blade, or a tool. In some embodiments, the tool comprises a digging bucket, a hammer, a hydraulic thumb, coupler, breaker, compactor, grading bucket, demolition grapple, and tiltrotator.

The components/tools 116 can affect the environment of the EMV as the components and/or tools are moved based on the output of the second machine learning model 112. The changed environment can be sensed by the sensors 102 as described above, and the data can be saved in the memory 114 as additional second sensor data 106. For example, as a digger digs ground to a certain depth, a depth sensor, for example, can detect that the depth has changed, and this information can be provided in the form of second sensor data 106 in the memory 114. Then the first and second machine learning algorithms 110 and 112 can be fine-tuned using the additional second sensor data 106.

Methods of Augmented Learning with EMVs

Figure 2:
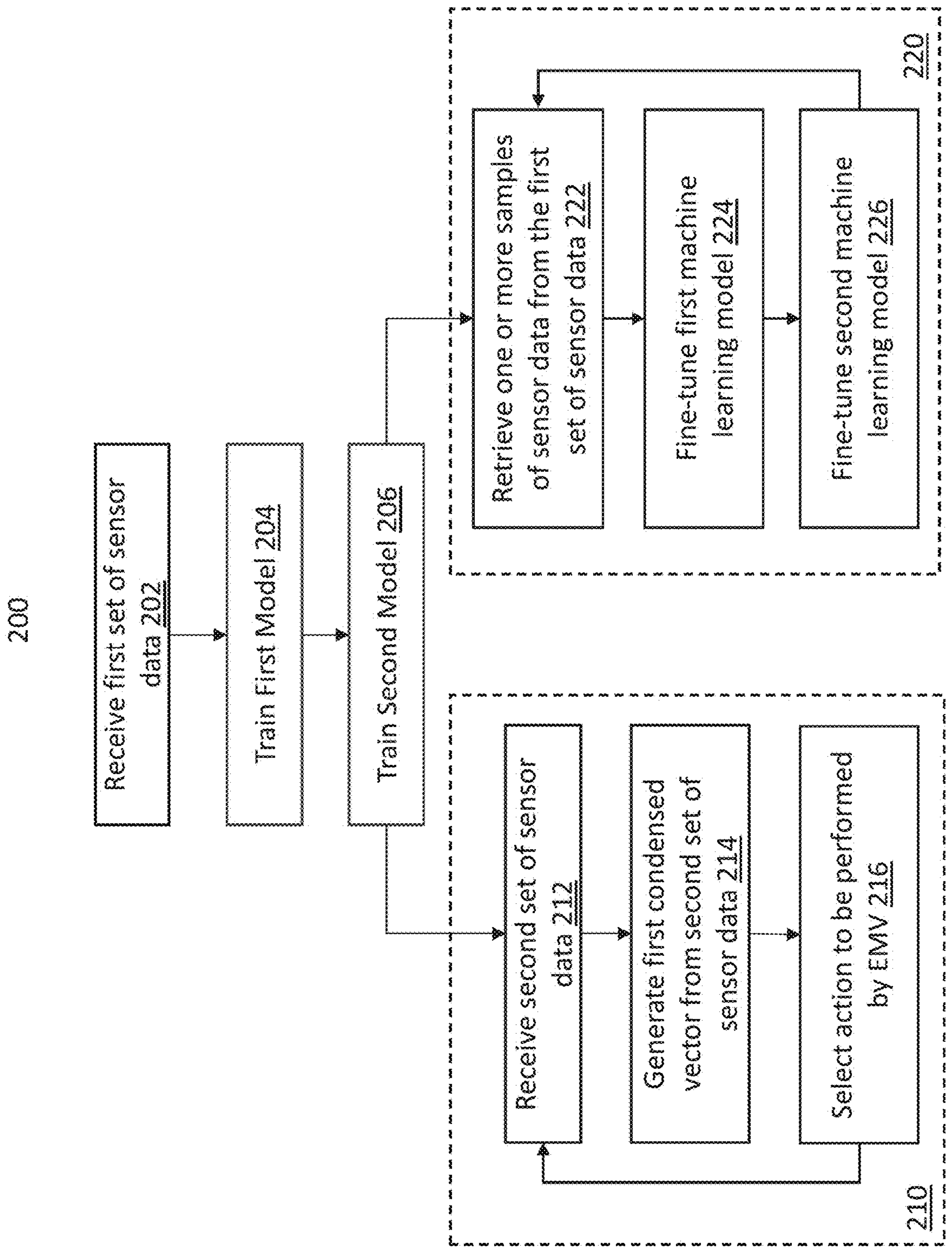
FIG. 2 shows a non-limiting example of a flow diagram for operating autonomous EMVs with augmented learning.

FIG. 2 shows a non-limiting example of a flow diagram 200 for operating autonomous EMVs with augmented learning. The flow diagram 200 includes a series of steps that can be performed sequentially and/or in parallel. Each of the steps of the flow diagram 200 can be performed by one or more processors, and the one or more processors can be disposed in the EMV and/or remotely disposed from the EMV (e.g., in one or more servers). One of ordinary skill will recognize that in some embodiments, the steps of the flow diagram 200 can include additional steps and/or some steps can be removed.

In some embodiments, the EMV can receive a first set of sensor data from a computer data store (e.g., memory 114) (step 202). The EMV data or sensor data can include a first set of sensor data (e.g., first sensor data 104) and a second set of sensor data (e.g., second sensor data 106). The first set of sensor data can include offline data which can include, for example, data of the EMV such as type of vehicle, past actions, operating time, and other operational data. The offline data can also include data about the EMV's environment such as weather, time, materials, and others. The offline data can include data that were previously sensed by the sensors and stored. The first set of sensor data can include the data used to train the models.

The second sensor data can include additional data that is received and/or detected and/or sensed after the machine learning models have been trained. The second set of sensor data or a subset thereof can be used to fine-tune the models as described herein.

In some embodiments, the method further comprises condensing, by sampling, the first set of sensor data. For example, rather than storing the entire first set of sensor data, the memory may store a subset of the sensor data. In some embodiments, a sampling function may be used to sample the first set of sensor data. For example, if the GPS data indicates that the EMV has not moved in the last day, and if the GPS sensor is configured to detect the location of the EMV every 1 minute, the memory does not need to include 60 minutes/hours×24 hours/day=1440 records of GPS data that indicates the same thing. Accordingly, the sampling function can reduce the number of redundancies saved in the memory. In some embodiments, the sampling function may include randomly selecting data to be saved in the memory.

Initial Training of EMVs

In some embodiments, the method further comprises training (or initially training), by the one or more processors, a first machine learning model (e.g., first ML model 110) on the first set of sensor data (step 204). The training of the first machine learning model can occur before the first and second threads of instruction are executed. The first machine learning model can include a world model that is trained on all of the first set of sensor data or offline data from the memory buffer. The first machine learning model can be trained to predict or output a first condensed vector. In some embodiments, the first condensed vector is or includes a learned representation, an encoding, or an embedding.

A learned representation includes a set of features or characteristics of the input data that have been learned by a neural network or other machine learning model through the process of training. An encoding includes to the process of transforming data from one format to another format suitable for machine learning models. An embedding includes a mapping of discrete and categorical variables, such as words or categories, to a continuous vector space, usually of much lower dimension than the original space.

In some embodiments, the method further comprises training (or initially training), by the one or more processors, a second machine learning model (e.g., second ML model 112) at least in part on the first condensed vector produced by the first machine learning model (step 206). In some embodiments, the second machine learning model can include a behavior model that is trained on the first condensed vector that is output by the world model (e.g., the first machine learning model). In some embodiments, the second machine learning model can be trained to output an action for the EMV.

In some embodiments, the method further comprises training, by the one or more processors, the second machine learning model on the first set of sensor data.

In a neural network, for example, the model parameters include the weights and biases of the network. In some embodiments, the first machine learning model includes a first set of weights (or model weights) and biases and the second machine learning model includes a second set of weights (or model weights) and biases. During the training process, the model parameters can be initialized randomly, and then updated iteratively using an optimization algorithm such as gradient descent. During training, the models and biases can be modified to find the values of the model parameters that minimize a chosen loss function, which measures the difference between the predicted output of the model and the ground truth or true state of training example summed over all training examples which can include the actual output as measured which may or may not be the same as the predicted output of the second machine learning model. In some embodiments, the goal is to minimize the loss function to improve the model. Once the model has been trained and the optimal values of the model parameters have been found, the model can be used to make predictions on new, unseen data. The first set of weights can be modified during training based at least in part on the first set of sensor data. The second set of weights can be modified during training based at least in part on the first condensed vector and/or the first set of sensor data.

EMV Action Determination and Augmented Learning

In some embodiments, a method for autonomous operation of a vehicle is disclosed. The method includes maintaining, at a computer data store, a first set of sensor data. The method further includes, until a convergence condition is reached, executing, by one or more processors, a first set of instructions and a second set of instructions in parallel. The first set of instructions can include (1) receiving the second set of sensor data, where the second set of sensor data is not included within the first set of sensor data (step 212); (2) generating a first condensed vector from the second set of sensor data at least in part by processing the second set of sensor data with a first machine learning model (step 214); (3) selecting an action to be performed by the vehicle at least in part by processing the first condensed vector with the second machine learning model (step 216). The second set of instructions can include: (1) retrieving one or more samples of sensor data from the first set of sensor data and/or the second set of sensor data (step 222); (2) fine-tuning the first machine learning model at least in part by processing the one or more samples of sensor data to produce a second condensed vector (step 224); and (3) fine-tuning the second machine learning model at least in part by processing the second condensed vector (step 226).

In some embodiments, a first thread 210 can include a series of steps (e.g., steps 212, 214, and 216) that result in an action being determined by the second machine learning model. The action can be actuated or performed by the EMV or a component or tool of the EMV (e.g., components/tools 116).

Step 212 of receiving the second set of sensor data includes reading the second set of sensor data from the memory. The second set of sensor data can include input to be provided to the first machine learning model. The second set of sensor data can include data about the environment and/or EMV and/or component/tool thereof as discussed herein.

Step 214 of generating the first condensed vector from the second set of sensor data includes the first machine learning model to generate the first condensed vector. In some embodiments, the method further comprises condensing, by sampling, the second set of sensor data. Similar to the sampling of the first set of sensor data described above, the second set of sensor data may be sampled and condensed to save space in the memory.

Step 216 of selecting an action to be performed by the EMV includes generating an action based at least in part on the second machine learning model. The input to the second machine learning model can include the first condensed vector and the output can include a learned representation, embedding or encoding of an action to be performed by the EMV or a component/tool thereof.

Once the output is provided (and optionally after the completion of the action), the thread 210 may repeat by going back to step 212. The thread 210 may repeat until a convergence condition is reached.

In some embodiments, a second thread 220 can include a series of steps (e.g., steps 222, 224, 226) that can be performed to fine-tune the first and second machine learning models. The fine-tuning allows the models to be more accurate and adapt to the environment around them. The EMV can then more accurately and efficiently perform the tasks it has been assigned.

Step 222 of retrieving one or more samples of sensor data from the first set of sensor data can include using a sampling function. In some embodiments, the one or more samples of sensor data are sampled from the memory or memory buffer.

Step 224 of fine-tuning the first machine learning model can include processing the samples of sensor data from the first set of sensor data to fine-tune the first machine learning model. The fine-tuned first machine learning model can output a second condensed vector.

Step 226 of fine-tuning the second machine learning model can include receiving the second condensed vector as input for fine-tuning the second machine learning model.

Once step 226 is complete, the thread 220 can repeat with the instructions of steps 222, 224, and 226 repeating until a convergence condition is reached.

In some embodiments, the fine-tuning further comprises changing the first set of model weights and/or the second set of model weights based on an outcome of the action. In some embodiments, the fine-tuning can further comprise computing the differences between the first set of sensor data and the second set of sensor data. In some embodiments, the model weights or a subset of the model weights can be adjusted to more accurately produce the first condensed vector and second condensed vector.

In some embodiments, the action is selected from a finite set of actions. In some embodiments, the finite set of actions comprises a movement of the vehicle, an actuation of a portion of the vehicle, powering up the vehicle, powering down the vehicle, and/or reversing a previous operation of the vehicle. In some embodiments, a movement of the vehicle comprises a forward, backward, or sideways movement of the vehicle. In some embodiments, a movement of the portion of the vehicle comprises an upward, downward, forward, or sideways movement of an arm of the vehicle. In some embodiments, a movement of the portion of the vehicle comprises an outward or inward movement of a tool connected to the arm of the vehicle.

In some embodiments, the convergence condition is associated with a number of actions performed by the vehicle. In some embodiments, a completion of the number of actions comprises a task. The convergence condition may be set by a user or predetermined. For example, at a construction site, if the digger is tasked to dig land in an area, the convergence condition may include the completion of digging the land in the area. One or more sensors can be used to determine whether or not the convergence has been reached.

Computing System

Figure 3:
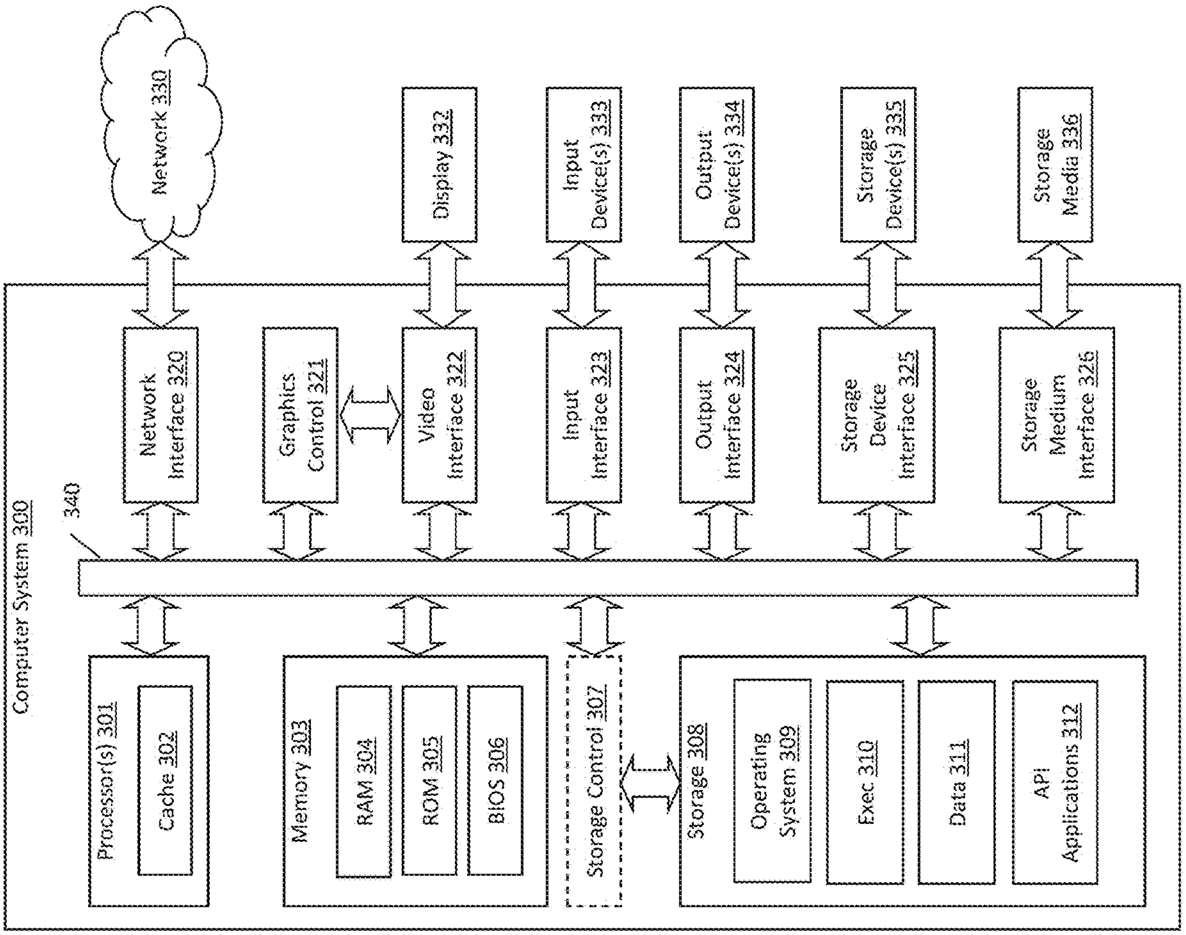
FIG. 3 shows a non-limiting example of a computing device; in this case, a device with one or more processors, memory, storage, and a network interface, in accordance with some embodiments.

Referring to FIG. 3, a block diagram is shown depicting an exemplary machine (e.g., EMV) that includes a computer system 300 (e.g., a processing or computing system) within which a set of instructions can execute for causing a device to perform or execute any one or more of the aspects and/or methodologies for static code scheduling of the present disclosure. The components in FIG. 3 are examples only and do not limit the scope of use or functionality of any hardware, software, embedded logic component, or a combination of two or more such components implementing particular embodiments.

Computer system 300 may include one or more processors 301, a memory 303, and a storage 308 that communicate with each other, and with other components, via a bus 340. The bus 340 may also link a display 332, one or more input devices 333 (which may, for example, include a keypad, a keyboard, a mouse, a stylus, etc.), one or more output devices 334, one or more storage devices 335, and various tangible storage media 336. All of these elements may interface directly or via one or more interfaces or adaptors to the bus 340. For instance, the various tangible storage media 336 can interface with the bus 340 via storage medium interface 326. Computer system 300 may have any suitable physical form, including but not limited to one or more integrated circuits (ICs), printed circuit boards (PCBs), laptop or notebook computers, distributed computer systems, computing grids, or servers.

Computer system 300 includes one or more processor(s) 301 (e.g., central processing units (CPUs), general purpose graphics processing units (GPGPUs), or quantum processing units (QPUs)) that carry out functions. Processor(s) 301 optionally contains a cache memory unit 302 for temporary local storage of instructions, data, or computer addresses. Processor(s) 301 are configured to assist in execution of computer readable instructions. Computer system 300 may provide functionality for the components depicted in FIG. 3 as a result of the processor(s) 301 executing non-transitory, processor-executable instructions embodied in one or more tangible computer-readable storage media, such as memory 303, storage 308, storage devices 335, and/or storage medium 336. The computer-readable media may store software that implements particular embodiments, and processor(s) 301 may execute the software. Memory 303 may read the software from one or more other computer-readable media (such as mass storage device(s) 335, 336) or from one or more other sources through a suitable interface, such as network interface 320. The software may cause processor(s) 301 to carry out one or more processes or one or more steps of one or more processes described or illustrated herein. Carrying out such processes or steps may include defining data structures stored in memory 303 and modifying the data structures as directed by the software.

The memory 303 may include various components (e.g., machine readable media) including, but not limited to, a random access memory component (e.g., RAM 304) (e.g., static RAM (SRAM), dynamic RAM (DRAM), ferroelectric random access memory (FRAM), phase-change random access memory (PRAM), etc.), a read-only memory component (e.g., ROM 305), and any combinations thereof. ROM 305 may act to communicate data and instructions unidirectionally to processor(s) 301, and RAM 304 may act to communicate data and instructions bidirectionally with processor(s) 301. ROM 305 and RAM 304 may include any suitable tangible computer-readable media described below. In one example, a basic input/output system 306 (BIOS), including basic routines that help to transfer information between elements within computer system 300, such as during start-up, may be stored in the memory 303.

Fixed storage 308 is connected bidirectionally to processor(s) 301, optionally through storage control unit 307. Fixed storage 308 provides additional data storage capacity and may also include any suitable tangible computer-readable media described herein. Storage 308 may be used to store operating system 309, executable(s) 310, data 311, applications 312 (application programs), and the like. Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with computer system 300 (e.g., via an external port connector (not shown)) via a storage device interface 325. Particularly, storage device(s) 335 and an associated machine-readable medium may provide non-volatile and/or volatile storage of machine-readable instructions, data structures, program modules, and/or other data for the computer system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 300 may also include an input device 333. In one example, a user of computer system 300 may enter commands and/or other information into computer system 300 via input device(s) 333. Examples of an input device(s) 333 include, but are not limited to, an alphanumeric input device (e.g., a keyboard), a pointing device (e.g., a mouse or touchpad), a touchpad, a touch screen, a multi-touch screen, a joystick, a stylus, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 333 may be interfaced to bus 340 via any of a variety of input interfaces 323 (e.g., input interface 323) including, but not limited to, serial, parallel, USB, FIREWIRE, THUNDERBOLT, or any combination of the above.

In particular embodiments, when computer system 300 is connected to network 330, computer system 300 may communicate with other devices, specifically mobile devices and enterprise systems, distributed computing systems, cloud storage systems, cloud computing systems, and the like, connected to network 330. Communications to and from computer system 300 may be sent through network interface 320. For example, network interface 320 may receive incoming communications (such as requests or responses from other devices) in the form of one or more packets (such as Internet Protocol (IP) packets) from network 330, and computer system 300 may store the incoming communications in memory 303 for processing. Computer system 300 may similarly store outgoing communications (such as requests or responses to other devices) in the form of one or more packets in memory 303 and communicated to network 330 from network interface 320. Processor(s) 301 may access these communication packets stored in memory 303 for processing.

Examples of the network interface 320 include, but are not limited to, a network interface card, a modem, and any combination thereof. Examples of a network 330 or network segment 330 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 330, may employ a wired and/or a wireless mode of communication. In general, any network topology may be used.

Information and data can be displayed through a display 332. Examples of a display 332 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 332 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 321. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 332, computer system 300 may include one or more other peripheral output devices 334 including, but not limited to, an audio speaker, a printer, a storage device, and any combinations thereof. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition or as an alternative, computer system 300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, media streaming devices, handheld computers, Internet appliances, tablet computers, personal digital assistants, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD, Linux, Apple Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid-state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, which perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion™, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 4:
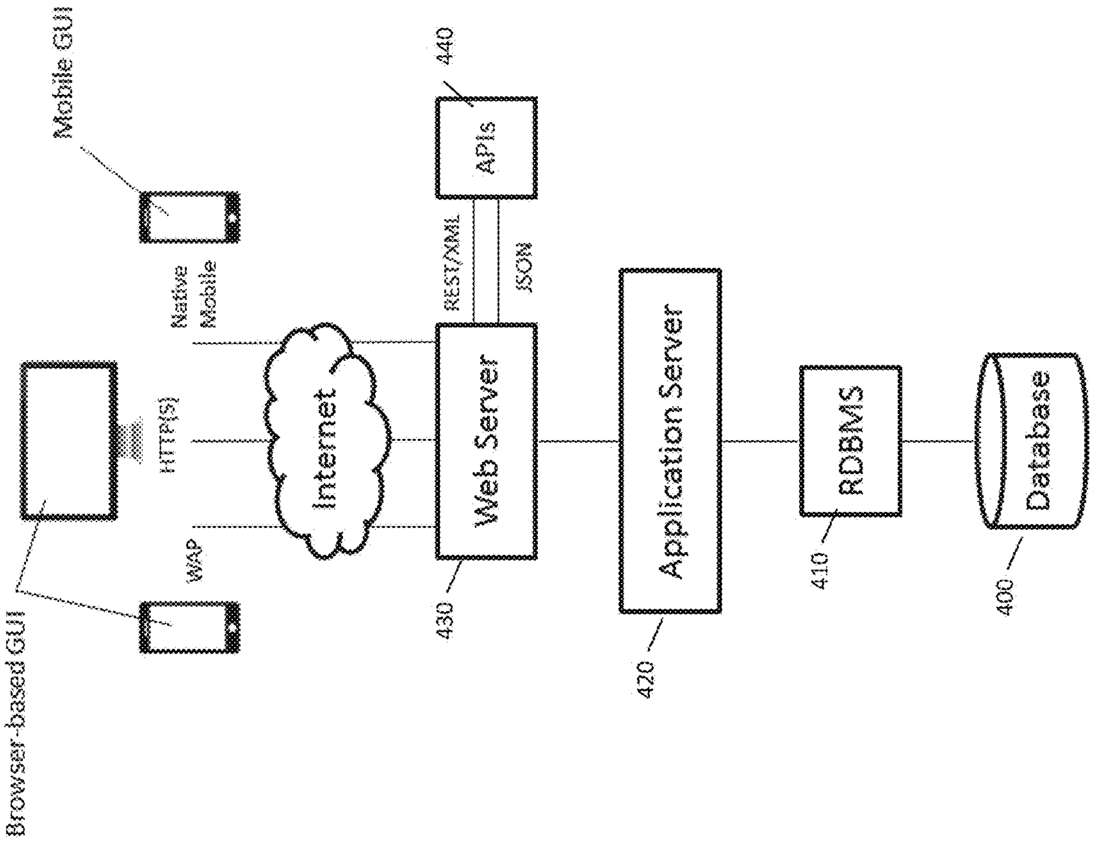
FIG. 4 shows a non-limiting example of a web/mobile application provision system; in this case, a system providing browser-based and/or native mobile user interfaces, in accordance with some embodiments.

Referring to FIG. 4, in a particular embodiment, an application provision system comprises one or more databases 400 accessed by a relational database management system (RDBMS) 410. Suitable RDBMSs include Firebird, MySQL, PostgreSQL, SQLite, Oracle Database, Microsoft SQL Server, IBM DB2, IBM Informix, SAP Sybase, Teradata, and the like. In this embodiment, the application provision system further comprises one or more application severs 420 (such as Java servers, .NET servers, PHP servers, and the like) and one or more web servers 430 (such as Apache, IIS, GWS and the like). The web server(s) optionally expose one or more web services via app application programming interfaces (APIs) 440. Via a network, such as the Internet, the system provides browser-based and/or mobile native user interfaces.

Figure 5:
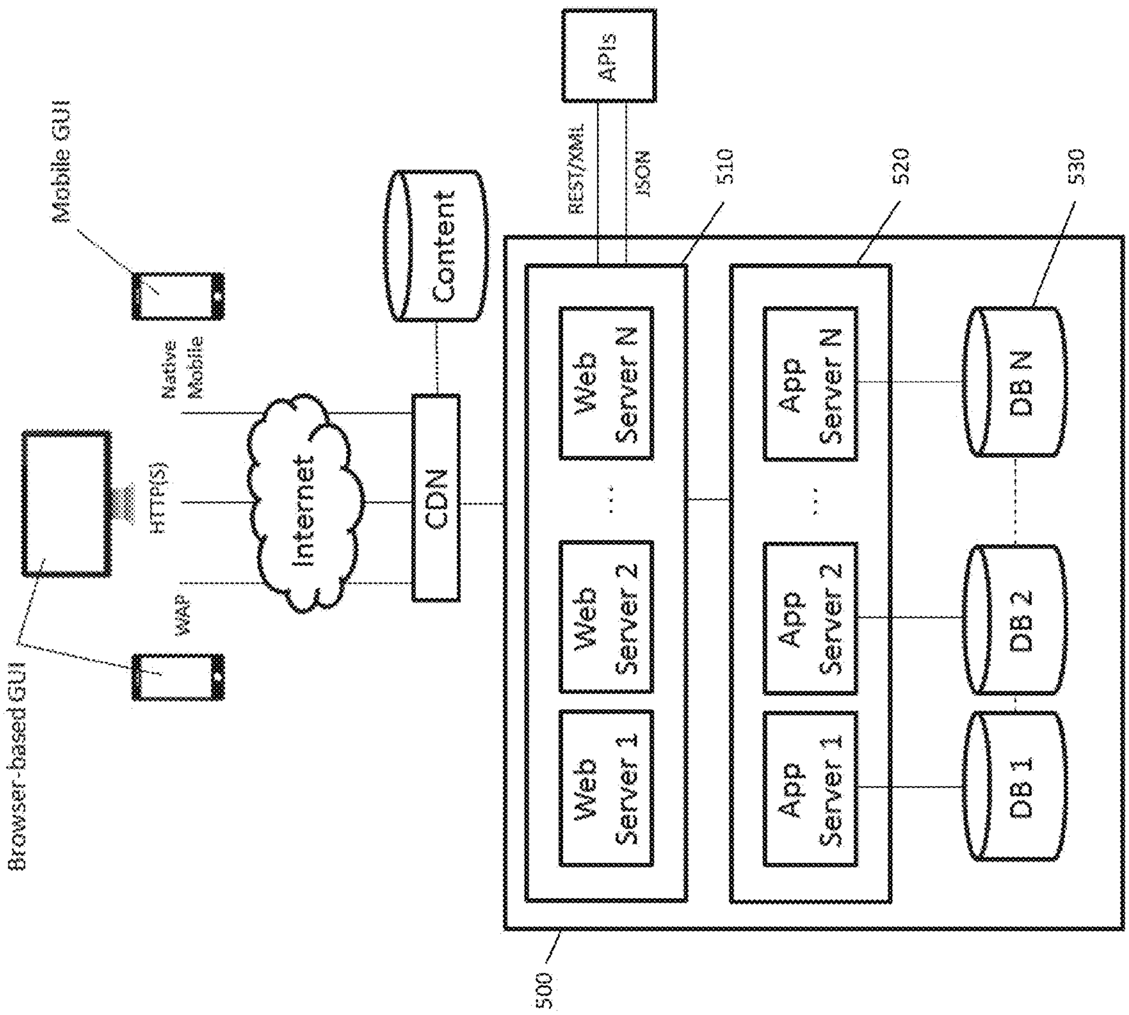
FIG. 5 shows a non-limiting example of a cloud-based web/mobile application provision system; in this case, a system comprising an elastically load balanced, auto-scaling web server and application server resources as well synchronously replicated databases, in accordance with some embodiments.

Referring to FIG. 5, in a particular embodiment, an application provision system alternatively has a distributed, cloud-based architecture 500 and comprises elastically load balanced, auto-scaling web server resources 510 and application server resources 520 as well synchronously replicated databases 530.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and PhoneGap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of, for example, sensor data, model weights, LIDAR data, GPS data, vehicle state data, position data, motion data, and other types of data discussed in this disclosure. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

Definitions

As used in this specification and the appended claims, the terms "artificial intelligence," "artificial intelligence techniques," "artificial intelligence operation," and "artificial intelligence algorithm" generally refer to any system or computational procedure that may take one or more actions to enhance or maximize a chance of achieving a goal. The term "artificial intelligence" may include "generative modeling," "machine learning" (ML), or "reinforcement learning" (RL).

As used in this specification and the appended claims, the terms "machine learning," "machine learning techniques," "machine learning operation," and "machine learning model" generally refer to any system or analytical or statistical procedure that may progressively improve computer performance of a task.

As used in this specification and the appended claims, "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values.

For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for autonomous operation of a vehicle, comprising:
- (a) maintaining, at a computer data store, a first set of pre-existing offline sensor data;
- (b) training, by one or more processors, a first machine learning model utilizing the first set of pre-existing offline sensor data, wherein the first machine learning model comprises a world model;
- (c) until a convergence condition is reached, executing, by the one or more processors, a first set of instructions and a second set of instructions in parallel,
  - (i) the first set of instructions comprising:
    - (1) receiving a second set of sensor data, wherein the second set of sensor data is generated subsequently to the training of the first machine learning model and is not included within the first set of pre-existing offline sensor data;
    - (2) generating, by the world model, a first condensed vector from the second set of sensor data at least in part by processing the second set of sensor data with the first machine learning model; and
    - (3) selecting or generating an action to be performed by the vehicle, or a component of the vehicle, at least in part by processing the first condensed vector with a second machine learning model, wherein the second machine learning model comprises a behavioral model;
  - (ii) the second set of instructions comprising:
    - (1) retrieving one or more samples of sensor data from the first set of pre-existing offline sensor data and/or the second set of sensor data;
    - (2) updating the first machine learning model at least in part by processing the one or more samples of sensor data to produce a second condensed vector; and
    - (3) updating the second machine learning model at least in part by processing the second condensed vector, wherein the behavioral model of the second machine learning model selects or generates the action to be performed by the vehicle.

2. The method of claim 1, wherein the first machine learning model includes a first set of model weights, and the second machine learning model includes a second set of model weights.

3. The method of claim 2, wherein the updating further comprises changing the first set of model weights and/or the second set of model weights based on an outcome of the action.

4. The method of claim 1, further comprising training, by the one or more processors, the second machine learning model on the first set of pre-existing offline sensor data.

5. The method of claim 1, further comprising, prior to (b), condensing, by sampling, the first set of pre-existing offline sensor data.

6. The method of claim 5, further comprising, prior to generating, by the world model, the first condensed vector, condensing, by sampling, the second set of sensor data.

7. The method of claim 5, wherein the updating further comprises computing differences between the first set of pre-existing offline sensor data and the second set of sensor data.

8. The method of claim 1, wherein the first set of pre-existing offline sensor data comprises light detection and ranging (LIDAR) data, GPS data, vehicle state data, or a combination thereof, and wherein the second set of sensor data comprises LIDAR data, GPS data, vehicle state data, or a combination thereof.

9. The method of claim 8, wherein the vehicle state data comprises position data or motion data.

10. The method of claim 9, wherein the position data is associated with a component of the vehicle.

11. The method of claim 10, wherein the position data is associated with an angle or orientation of the component of the vehicle.

12. The method of claim 9, wherein the motion data relates to speed or acceleration.

13. The method of claim 12, wherein the motion data is the speed of the vehicle.

14. The method of claim 12, wherein the motion data is the acceleration of the vehicle.

15. The method of claim 9, wherein the motion data is associated with the component of the vehicle.

16. The method of claim 15, wherein the motion data relates to speed or acceleration.

17. The method of claim 1, wherein, in (c)(ii)(1), the one or more samples of sensor data are sampled from a memory buffer.

18. The method of claim 1, wherein the first condensed vector or the second condensed vector is a learned representation, an encoding, or an embedding.

19. A system for autonomous operation of a vehicle, the system comprising:
- a computer data store configured to maintain a first set of pre-existing offline sensor data; and
- one or more processors configured to:
  - (a) train a first machine learning model of the one or more processors utilizing the first set of pre-existing offline sensor data, wherein the first machine learning model comprises a world model;
  - (b) execute a first set of instructions and a second set of instructions in parallel until a convergence condition is reached, (i) the first set of instructions comprising:

(1) receiving a second set of sensor data, wherein the second set of sensor data is generated subsequently to the training of the first machine learning model and is not included within the first set of pre-existing offline sensor data;

(2) generating, by the world model, a first condensed vector from the second set of sensor data at least in part by processing the second set of sensor data with the first machine learning model; and (3) selecting or generating an action to be performed by the vehicle, or a component of the vehicle, at least in part by processing the first condensed vector with a second machine learning model, wherein the second machine learning model comprises a behavioral model;

(ii) the second set of instructions comprising:

(1) retrieving one or more samples of sensor data from the first set of pre-existing offline sensor data and/or the second set of sensor data;

(2) updating the first machine learning model at least in part by processing the one or more samples of sensor data to produce a second condensed vector; and (3) updating the second machine learning model at least in part by processing the second condensed vector, wherein the behavioral model of the second machine learning model selects or generates the action to be performed by the vehicle.

20. The system of claim 19, wherein the one or more processors are further configured to modify a first set of model weights and/or a second set of model weights based on an outcome of the action.

* * * * *